United States Patent [19]

Ward

[11] Patent Number: 4,680,133
[45] Date of Patent: Jul. 14, 1987

[54] STRIPPING COMPOSITION CONTAINING AN AMIDE AND A CARBONATE AND USE THEREOF

[75] Inventor: Irl E. Ward, Easton, Pa.

[73] Assignee: Environmental Management Associates, Inc., Macungie, Pa.

[21] Appl. No.: 844,385

[22] Filed: Mar. 26, 1986

[51] Int. Cl.$^4$ .......................... C09D 9/00; C11D 7/32; C11D 7/50; C11D 7/52

[52] U.S. Cl. ...................................... 252/153; 134/38; 252/162; 252/170; 252/171; 252/364; 252/544; 252/DIG. 8

[58] Field of Search .................... 134/38, 39; 252/153, 252/162, 170, 171, 364, DIG. 8

[56] References Cited

U.S. PATENT DOCUMENTS

| | | | |
|---|---|---|---|
| 1,924,722 | 8/1933 | Lovell | 252/153 |
| 2,704,733 | 3/1955 | Pearsall | 134/20 |
| 2,932,618 | 4/1960 | Oberdorfer | 252/143 |
| 2,935,479 | 5/1960 | Oberdorfer | 252/170 |
| 2,991,254 | 7/1961 | Oberdorfer | 252/170 |
| 3,324,039 | 6/1967 | Rosenfeld | 252/153 |
| 3,382,181 | 5/1968 | Oberdorfer | 252/170 |
| 3,705,857 | 12/1972 | Clarke | 252/170 |
| 3,784,477 | 1/1974 | Esposito | 252/162 |
| 3,806,465 | 4/1974 | Karl | 252/316 |
| 4,508,634 | 4/1985 | Elepano | 252/163 |
| 4,594,111 | 6/1986 | Coonan | 134/3 |

*Primary Examiner*—Dennis L. Albrecht
*Attorney, Agent, or Firm*—Parmelee, Bollinger & Bramblett

[57] ABSTRACT

Stripping compositions for removing paints, varnishes, enamels and the like, from substrates comprising compositions of (a) an amide compound of the formula:

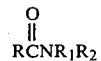

and mixtures thereof, wherein R is selected from the group consisting of hydrogen, methyl, ethyl, propyl and phenyl; $R_1$ and $R_2$ are selected from the group consisting of hydrogen and methyl; and mixtures of said amide compounds; and (b) a carbonate compound of the formula:

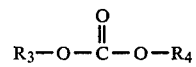

and mixtures thereof, wherein $R_3$ and $R_4$ are selected from the group consisting of methyl, ethyl or $R_3$ and $R_4$ together form a divalent ethylene, propylene or butylene group of a cyclic carbonate.

22 Claims, No Drawings

STRIPPING COMPOSITION CONTAINING AN AMIDE AND A CARBONATE AND USE THEREOF

FIELD OF THE INVENTION

This invention relates to stripping compositions particularly useful for stripping paints, varnishes, enamels and the like, from various substrates such as, for example, from wood or metal substrates. This invention also relates to the use of such stripping compositions to strip paint, varnishes, enamels and the like, from various substrates.

BACKGROUND OF THE INVENTION

Stripping compositions used for removing coatings from substrates have for the most part been highly flammable compositions, compositions generally hazardous to both humans and the environment and compositions which are reactive solvent mixtures evidencing an undesirable degree of toxicity. Moreover, these stripping compositions are not only toxic but their disposal is costly since they must be disposed of as a hazardous waste. In addition, these stripping compositions generally have severely limited bath life and, for the most part, are not recyclable or reusable.

Generally, compositions containing chlorinated hydrocarbons and/or phenolic compounds or other highly caustic and corrosive materials have been employed as stripping compositions for stripping paints, varnishes, lacquers, enamels powder coatings and the like, from substrates such as wood or metal. Hot caustic compositions are generally employed to remove coatings from metals and methylene chloride compositions to remove coatings from wood. In many cases the components of the stripping compositions are relatively toxic reactive solvent mixtures and thus must be subject to stringent use conditions and require hazardous chemical handling procedures and wearing of safety garments and apparel by users so as to avoid contact with the stripping compositions.

Additionally, because many of the toxic components of such stripping compositions are highly volatile and subject to unduly high evaporation rates, the stripping compositions require special human and environmental safety precautions to be taken during storage and use of said compositions.

Recently, OSHA, EPA and other similar Federal, State and Local Governmental Regulatory Agencies have advocated a shift toward use of more human and environmentally compatible stripping compositions and stripping methods that are not subject to the aforementioned drawbacks and problems.

Moreover, heretofore available stripping compositions have required unduly long residence times or repeated applications in order to remove certain coatings. In addition, various coatings have resisted removal from certain substrates with these heretofore available stripping compositions. That is, these previously available stripping compositions have not provided adequate or complete removal of certain hard-to-remove coatings from various substrates.

It is, therefore, highly desirable to provide stripping compositions that exhibit substantially no human or environmental toxicity, are water miscible and are biodegradable. It is also desirable to provide stripping compositions that are substantially non-flammable, non-corrosive, evidence relatively little, if any, tendency to evaporate and are generally unreactive and also innocuous to humans and are environmentally compatible. It would also be most desirable to provide stripping compositions that are recyclable, if desired, and thus available for extended bath life and multiple use. It is also desirable that stripping compositions be provided that permit the stripped coatings to be collected and removed as solids for easy disposal.

Moreover, it would be desirable to provide stripping compositions that have a high degree of stripping efficacy and particularly such a high degree of stripping efficacy at lower temperatures than generally required with prior stripping compositions.

It is also highly desirable that stripping compositions be provided that exhibit very low vapor pressure at elevated temperatures thereby significantly reducing evaporation and thus contamination of the atmosphere.

Additionally, it is highly desirable that such stripping compositions be provided that are effective and efficient stripping compositions for removal of coatings from substrates that heretofore have resisted ready removal with conventionally available strippers.

It is also desirable that effective stripping compositions be provided that are devoid of undesirable chlorinated or phenolic components and which do not require the use of hot caustic components. Highly desirable are stripping compositions and use thereof that are not considered undesirable by regulatory agencies overseeing their production and use.

It is also most advantageous that stripping compositions be provided with the above-identified desirable characteristics which evidence synergistic stripping action in that the mixtures of components provide stripping efficacy and stripping results not always obtainable with the individual components.

SUMMARY OF THE INVENTION

It has now been found that a suitable stripping composition in which the hereinbefore mentioned disadvantages or drawbacks are eliminated or substantially reduced and in which the range of usefulness of the stripping compositions is greatly extended can be obtained in accordance with the teachings of the present invention.

The novel stripping compositions of this invention comprise a mixture of:

(a) from about 25% to about 90% by weight of an amide compound of the formula:

(Formula I)

and mixtures thereof, wherein R is selected from the group consisting of hydrogen, methyl, ethyl, propyl and phenyl; $R_1$ and $R_2$ are selected from the group consisting of hydrogen and methyl; and (b) from about 10% to about 75% by weight a carbonate compound of the formula:

(Formula II)

and mixtures thereof, wherein $R_3$ and $R_4$ are selected from the group consisting of methyl or ethyl or $R_3$ and R₄ together form a divalent ethylene, propylene or butylene group of a cyclic carbonate.

The novel stripping compositions of this invention exhibit synergistically enhanced stripping action and provide stripping capabilities not possible from the use of the individual components used alone as strippers for coatings from various substrates.

DETAILED DESCRIPTION OF THE INVENTION

The stripping compositions of this invention comprise from about 25 to about 90%, preferably from about 45 to about 85% and most preferably from about 70 to 75%, by weight of an amide or mixture of such amides of Formula I and from about 10 to about 75%, preferably from about 15 to about 55% and most preferably from about 25 to about 30%, by weight, of an acyclic or cyclic carbonate compound or mixture of such carbonates of Formula II.

As examples of suitable amide compounds of Formula I useful in the compositions of this invention, there may be mentioned, for example, acetamide, formamide, propionamide, butyramide, benzamide, N,N-dimethyl acetamide, N,N-dimethyl formamide, N,N-dimethyl propionamide, N,N-dimethyl butyramide and N,N-dimethyl benzamide. Particularly preferred are N,N-dimethyl acetamide and N,N-dimethyl formamide.

As examples of carbonate compounds of Formula II useful in the compositions of this invention, there may be mentioned, for example, acyclic carbonates such as dimethyl carbonate and diethyl carbonate and cyclic carbonates, that is carbonate compounds of Formula II wherein R₃ and R₄ together form a divalent alkylene group, such as ethylene carbonate, propylene carbonate and butylene carbonate. Especially preferred are the aforementioned cyclic carbonate compounds which may be represented by the formula:

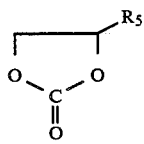

(Formula III)

wherein R₅ is selected from the group consisting of hydrogen, methyl or ethyl.

Preferred stripping compositions of this invention comprise from about 70 to about 75% by weight N,N-dimethyl acetamide or N,N-dimethyl formamide and from about 25 to about 30%, by weight, ethylene carbonate or propylene carbonate.

Two especially preferred stripping compositions of this invention comprise: (a) a mixture comprising about 70% by weight N,N-dimethyl acetamide and about 30% by weight propylene carbonate and (b) a mixture comprising about 70% by weight N,N-dimethyl formamide and about 30% by weight propylene carbonate.

As exemplary stripping compositions of this invention there can be mentioned the following compositions of Table I.

TABLE I

| Component | Percent by Weight Composition | | | | | |
|---|---|---|---|---|---|---|
| | A | B | C | D | E | F |
| Dimethyl formamide | | 70 | 90 | 60 | 25 | |
| Dimethyl acetamide | 70 | | | | | 70 |
| Ethylene carbonate | 30 | | 10 | | | |
| Propylene carbonate | | 30 | | 40 | 75 | 30 |

The stripping compositions of this invention may also contain, if desired, any suitable water miscible surfactant which does not adversely affect the stripping action of the compositions of this invention.

The stripping compositions of this invention are effective in stripping a wide and varied range of paints, enamels, lacquers, varnishes, urethane coatings, powder coatings and the like from various substrates such as wood or metal. As examples of wood or metal coatings that are stripped with the stripping compositions of this invention there may be mentioned, for examples, the following type coatings: linseed oil modified polyurethanes, white shellac, nitrocellulose coconut oil alkyds, acrylic modified alkyds, vinyl acetate/styrene/acrylic resins, tall oil-soya alkyds, soya-tung oil polyurethanes, tall oil linseed alkyds, epoxy paint, modified epoxy-ester resin paints, oil based enamels, alkyd enamels, marine varnishes, marine semi-gloss oil bases, latex enamels, lacquers, vinyl/acrylic resins, acrylic latexes, acrylic resins, phenolic resins and novolac/resole resins. The stripping compositions are also especially useful for stripping multiple layers of auto and metal enamels from metal substrates and are able to do so in a shorter time period and at a lower temperature than those previously used in commercial stripping compositions and methods.

The stripping compositions of this invention are especially useful and advantageous for numerous reasons among which may be mentioned the following. The stripping compositions are water miscible, non-corrosive, non-flammable and substantially innocuous to humans and the environment. Because of this high vapor pressure of the compositions they evidence substantially less evaporation than prior compositions and are non-reactive and environmentally compatible. The stripping compositions may be recycled for multiple use or easily disposed of in an environmentally safe manner without the necessity for burdensome safety precautions. Likewise, the stripped coatings may be readily removed as solids and collected for easy disposal. The stripping compositions of this invention evidence higher stripping efficiency at lower temperatures for a wide variety of coatings and substrates. Moreover, the stripping compositions are easily prepared by simply mixing the components at room temperature and thus require no special human or environmental safety precautions. Coatings not readily removed with previously available stripping compositions are readily and easily stripped with the stripping compositions of this invention. Furthermore, the components of the stripping compositions of this invention provide synergistic stripping action and permit readily and substantially complete removal of coatings from substrates that are not readily or completely removed by the individual components.

The effectiveness and unexpected nature of the stripping compositions of this invention is illustrated, but not limited, by the data presented in the following examples.

EXAMPLE 1

A single coat of semi-gloss oil based enamel (white) from Cook and Dunn Paint Corporation, Newark, N.J., was brushed onto test samples of birch wood at a temperature of about 21°-25° C. and permitted to cure/dry for a period of four weeks at this temperature. The wood test samples all evidenced good water absorption properties prior to painting. Following the cure/dry steps the test samples were subjected to stripping by brushing equivalent amounts of various stripping compositions on the painted test samples using a paint brush and resting the samples set for a specified period of time without disturbance. A soft cloth rag was then wetted with the stripping composition and an attempt at finish removal was made by rubbing the test sample with the wetted rag.

Stripping compositions consisting solely of dimethyl acetamide, or dimethyl formamide or propylene carbonate, individually, each removed less than 50% of the semi-gloss oil based enamel coating following a residence time of stripping composition on the painted test samples of at least 8 minutes. In contradistinction, stripping compositions of this invention, identified as Compositions B and F of Table I hereinbefore, removed at least 95% of the semi-gloss oil based enamel coating after a residence time of 5 minutes and at least 85% after a residence time of 7 minutes, respectively.

The test samples stripped with the compositions of this invention evidenced much better water absorption properties after stripping than the test samples stripped with the individual components.

EXAMPLE 2

Two coats of Man-O-War Ultra Spar Marine Varnish, from McCloskey Varnish Company, was brushed onto test samples of birch wood at a temperature of about 21°-25° C. and permitted to cure/dry for a period of four weeks at said temperature. The wood test samples all evidenced good water absorption properties prior to painting. Following the cure/dry step the test samples were subjected to stripping by brushing equivalent amounts of various stripping compositions on the painted test samples using a paint brush and letting the samples set for a specified period of time without disturbance. A soft cloth rag was then wetted with the stripping composition and an attempt at finish removal was made by rubbing the test sample with the wetted rag.

Stripping compositions consisting solely of dimethyl acetamide or dimethyl formamide or propylene carbonate, individually, each removed less than 50% of the marine varnish coatings following a residence time of stripping composition on the painted test samples of at least 8 minutes. In contradistinction, stripping compositions of this invention, identified as Compositions B and F of Table I, hereinbefore, removed at least 90% of the marine varnish coatings after a residence time of 6 minutes and at least 100% after a residence time of 4 minutes, respectively.

The test samples stripped with the compositions of this invention evidenced much better water absorption properties after stripping than the test samples stripped with the individual components.

EXAMPLE 3

A single coat of tall oil-soya alkyd resin plus 25.5% drier with mineral spirits solvent system (Glidden Spread Lustre semi-gloss enamel) was brushed onto test samples of birch wood at a temperature of about 21°-25° C. and permitted to cure/dry for a period of four weeks at said temperature. The wood test samples all evidenced good water absorption properties prior to painting. Following the cure/dry step the test samples were subjected to stripping by brushing equivalent amounts of various stripping compositions on the painted test samples using a paint brush and letting the samples set for a specified period of time without disturbance. A soft cloth rag was then wetted with the stripping composition and an attempt at finish removal was made by rubbing the test sample with the wetted rag.

Stripping compositions consisting solely of dimethyl acetamide or dimethyl formamide or propylene carbonate, individually, each removed less than 80% of the tall oil-soya alkyd resin following a residence time of stripping composition on the painted test samples of at least 8 minutes. In contradistinction, stripping compositions of this invention, identified as Compositions B and F of Table I, hereinbefore, removed at least 95% of the tall oil-soya alkyd resin after a residence time of 4 minutes and at least 100% after a residence time of 3 minutes, respectively.

The test samples stripped with the compositions of this invention evidenced much better water absorption properties after stripping than the test samples stripped with the individual components.

EXAMPLE 4

A steel bar with 37 layers of sequential heat and air cured automobile and metal enamels is stripped completely at 70° C. in under 75 minutes by stripping compositions B and F of Table I, hereinbefore. Presently, stripping of steel bars with such 37 coatings require anywhere from 8 to 24 hours in solvent enhanced hot caustic at a temperature of about 110°-120° C.

While the use of the hereinbefore recited stripping compositions of this invention has been described in connection with certain specific coatings and substrates for purposes of illustration, it will be appreciated that the stripping compositions of this invention are suitable for other stripping uses which will be apparent to those skilled in the art and can be employed with a variety of coatings on a variety of substrates in a variety of environments and industries.

What is claimed is:

1. A stripping composition comprising a mixture of:
 (a) from about 25% to about 90% by weight of an amide compound of the formula:

(Formula I)

and mixtures thereof, wherein R is selected from the group consisting of hydrogen, methyl, ethyl, propyl and phenyl; $R_1$ and $R_2$ are selected from the group consisting of hydrogen and methyl; and
 (b) from about 10% to about 75% by weight a carbonate compound of the formula:

(Formula II)

and mixtures thereof, wherein $R_3$ and $R_4$ are selected from the group consisting of methyl or ethyl or $R_3$ and $R_4$ together form a divalent ethylene, propylene or butylene group of a cyclic carbonate.

2. A stripping composition of claim 1 wherein the amide compound comprises from about 45 to about 85% by weight and the carbonate compound comprises from about 15 to about 55% by weight.

3. A stripping composition of claim 1 wherein the amide compound comprises from about 70 to about 75% by weight and the carbonate compound comprises from about 25 to about 30% by weight.

4. A stripping composition of claim 1 wherein the carbonate compound has the formula:

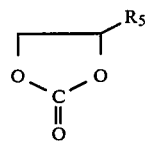

(Formula III)

wherein $R_5$ is selected from the group consisting of hydrogen, methyl or ethyl.

5. A stripping composition of claim 4 wherein the amide compound comprises from about 45 to about 85% by weight and the carbonate compound comprises from about 15 to about 55% by weight.

6. A stripping composition of claim 4 wherein the amide compound comprises from about 70 to about 75% by weight and the carbonate compound comprises from about 25 to about 30% by weight.

7. A stripping composition of claim 1 wherein the amide component is selected from the group consisting of dimethyl acetamide and dimethyl formamide and the carbonate component is selected from the group consisting of propylene carbonate and ethylene carbonate.

8. A stripping composition of claim 7 wherein the amide component is dimethyl acetamide.

9. A stripping composition of claim 7 wherein the amide component is dimethyl formamide.

10. A stripping composition of claim 8 comprising about 70% dimethyl acetamide and about 30% propylene carbonate.

11. A stripping composition of claim 9 comprising about 70% dimethyl formamide and about 30% propylene carbonate.

12. A process for removing a coating from a coated substrate comprising applying to said coated substrate a stripping effective amount of a stripping composition of claim 1, permitting said stripping composition to reside on said coated substrate for a stripping effective period of time and removing the coating from the substrate.

13. A process for removing a coating from a coated substrate comprising applying to said coated substrate a stripping effective amount of a stripping composition of claim 2, permitting said stripping composition to reside on said coated substrate for a stripping effective period of time and removing the coating from the substrate.

14. A process for removing a coating from a coated substrate comprising applying to said coated substrate a stripping effective amount of a stripping composition of claim 3, permitting said stripping composition to reside on said coated substrate for a stripping effective period of time and removing the coating from the substrate.

15. A process for removing a coating from a coated substrate comprising applying to said coated substrate a stripping effective amount of a stripping composition of claim 4, permitting said stripping composition to reside on said coated substrate for a stripping effective period of time and removing the coating from the substrate.

16. A process for removing a coating from a coated substrate comprising applying to said coated substrate a stripping effective amount of a stripping composition of claim 5, permitting said stripping composition to reside on said coated substrate for a stripping effective period of time and removing the coating from the substrate.

17. A process for removing a coating from a coated substrate comprising applying to said coated substrate a stripping effective amount of a stripping composition of claim 6, permitting said stripping composition to reside on said coated substrate for a stripping effective period of time and removing the coating from the substrate.

18. A process for removing a coating from a coated substrate comprising applying to said coated substrate a stripping effective amount of a stripping composition of claim 7, permitting said stripping composition to reside on said coated substrate for a stripping effective period of time and removing the coating from the substrate.

19. A process for removing a coating from a coated substrate comprising applying to said coated substrate a stripping effective amount of a stripping composition of claim 8, permitting said stripping composition to reside on said coated substrate for a stripping effective period of time and removing the coating from the substrate.

20. A process for removing a coating from a coated substrate comprising applying to said coated substrate a stripping effective amount of a stripping composition of claim 9, permitting said stripping composition to reside on said coated substrate for a stripping effective period of time and removing the coating from the substrate.

21. A process for removing a coating from a coated substrate comprising applying to said coated substrate a stripping effective amount of a stripping composition of claim 10, permitting said stripping composition to reside on said coated substrate for a stripping effective period of time and removing the coating from the substrate.

22. A process for removing a coating from a coated substrate comprising applying to said coated substrate a stripping effective amount of a stripping composition of claim 11, permitting said stripping composition to reside on said coated substrate for a stripping effective period of time and removing the coating from the substrate.

* * * * *